Dec. 9, 1952  F. M. CARROLL ET AL  2,620,978
SENSING MECHANISM

Filed June 2, 1951  4 Sheets-Sheet 2

INVENTORS
FRED M. CARROLL
GREY M. GURLEY
BY
G. R. Gugger
Agent

INVENTORS
FRED M. CARROLL
GREY M. GURLEY

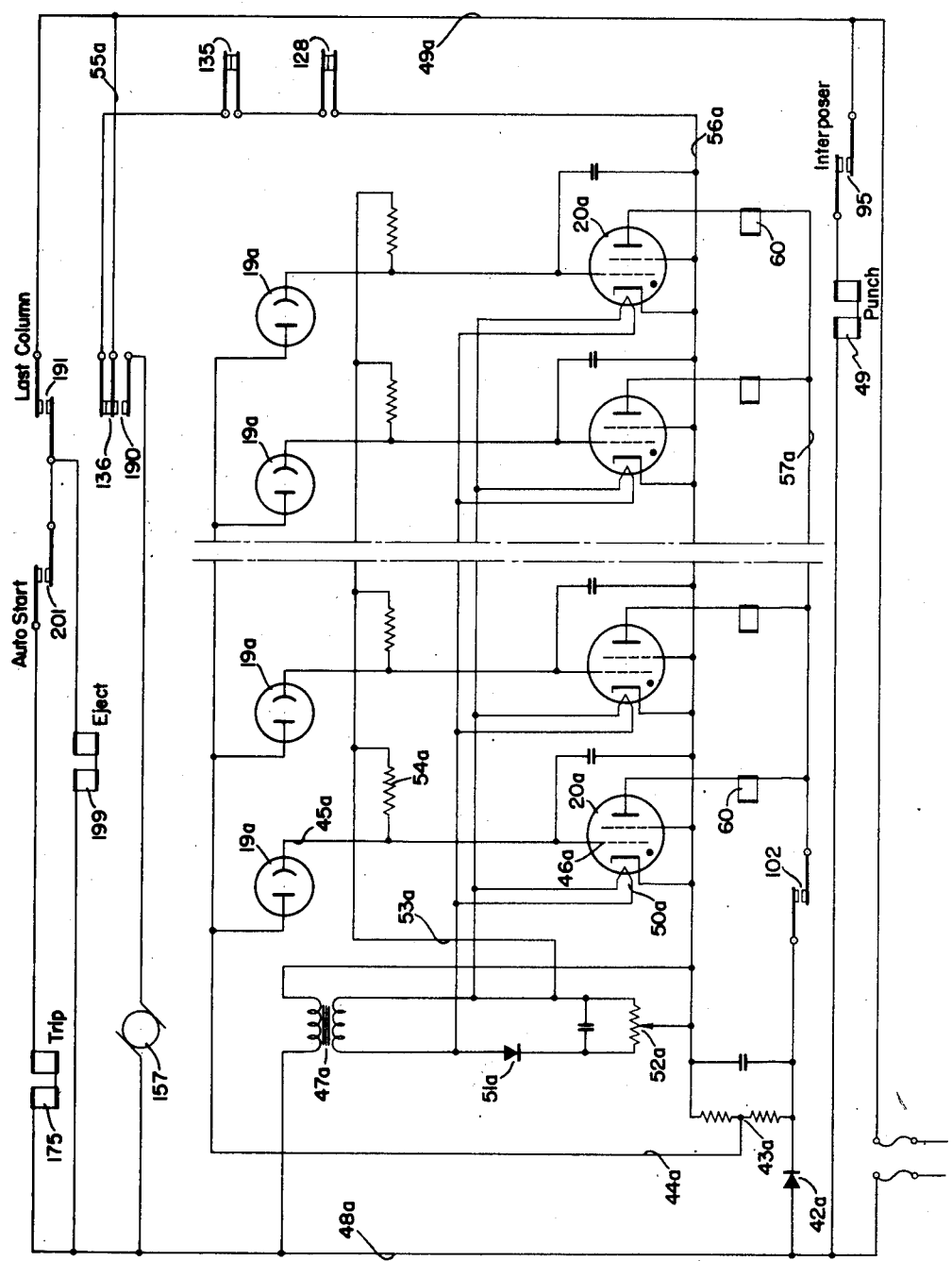

Patented Dec. 9, 1952

2,620,978

UNITED STATES PATENT OFFICE 2,620,978

SENSING MECHANISM

Fred M. Carroll, Binghamton, and Grey M. Gurley, Endwell, N. Y., assignors to International Business Machines Corporation, New York, N. Y., a corporation of New York Application June 2, 1951, Serial No. 229,574

4 Claims. (Cl. 235—61.11)

This invention relates to photoelectric sensing mechanisms and more particularly to the type adapted to analyze tabulating cards used in card controlled machines.

The invention is directed to improvements in photoelectric sensing mechanisms used in analyzing tabulating cards and in this regard it may be well to briefly mention that in the present state of the art the construction of such sensing mechanisms usually tends to approach unusual proportions in that the phototubes are generally located at rather remote distances from the light source. The phototubes are used to operate relays or magnet coils which in turn control various operations of tabulating machines such as printing or punching. It can be readily understood, then, that these operations are dependent upon accurate and timely response of the phototubes to the presence or absence of light as determined by the perforations in the tabulating cards being scanned.

It is well-known that the flow of current through a phototube is directly proportioned to the illumination of light at the cell of the phototube and since the illumination produced by a light source upon a given surface is determined by the intensity or energy radiated by the source and its distance from the surface it becomes apparent that the distance between the light source and phototubes warrants important consideration.

Accordingly the principal object of the invention is to provide a photoelectric sensing mechanism wherein the individual phototubes are brought as close to the light source as possible in order to utilize most efficiently the radiant energy.

A further object of the present invention is to provide a photoelectric sensing mechanism adapted to analyze a record card column-by-column and having the feature of improved compactness of construction.

In the appended drawings of the following specification, the novel sensing mechanism constituting the present invention is to be used in connection with a record controlled punching and duplicating machine of the type disclosed in F. Lee et al., Patent No. 1,976,618, granted October 9, 1934, to which recourse may be had for a disclosure of such a machine. It is to be understood, however, that the present disclosure should be considered as illustrative and not restrictive since features of the present invention may be applied to other forms of card controlled machines without departing from the spirit of the invention.

Other objects of the invention will be pointed out in the following description and claims and illustrated in the accompanying drawings which disclose by way of example, the principle of the invention and the best mode, which has been contemplated of applying that principle.

In the drawings:

Fig. 6 is a wiring diagram of the electrical circuits of the machine showing the manner in which the electrical elements of the invention are incorporated therein.

Figure 1:
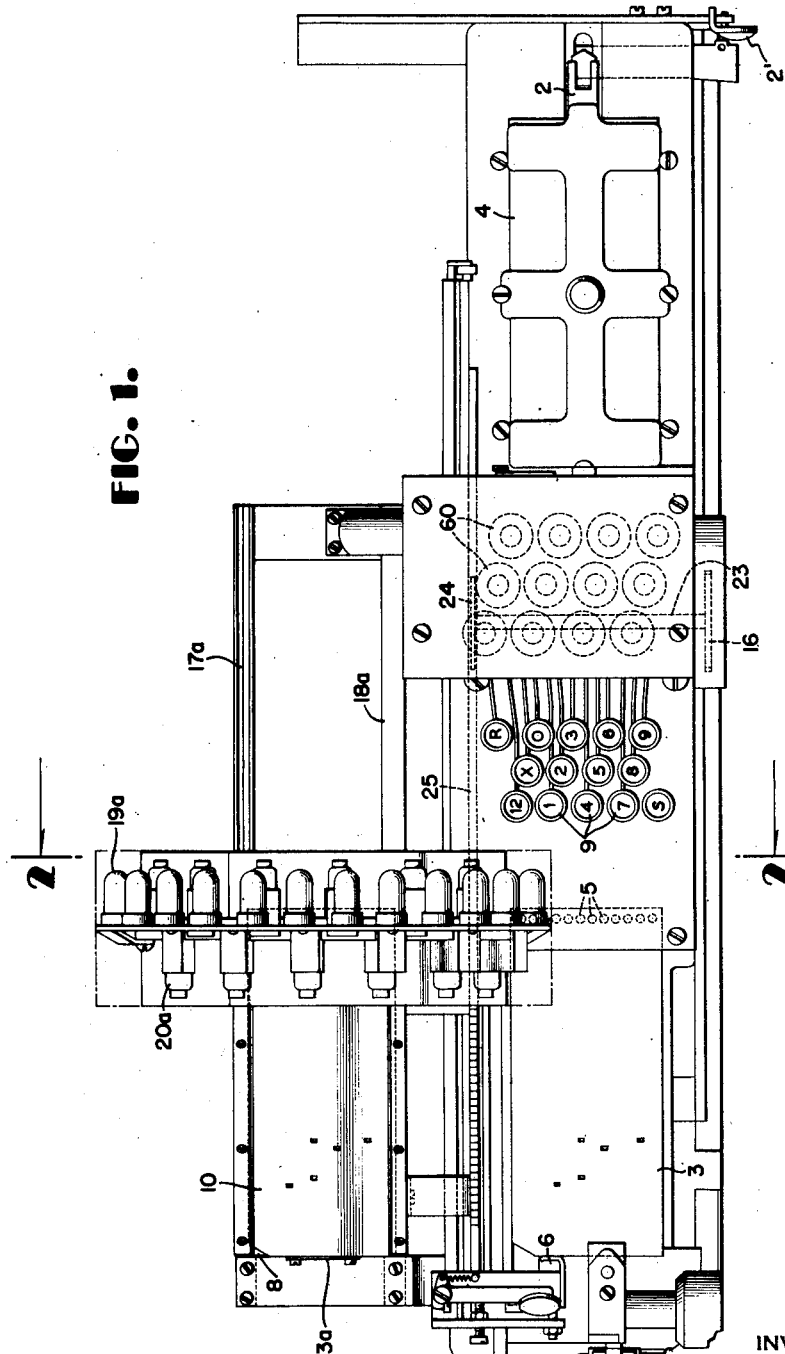
Fig. 1 is a top plan view of the punching and duplicating machine embodying the present invention.

The operation of the machine to which the invention is applied will first be briefly explained with reference to Fig. 1 and thereafter the manner in which the invention is applied thereto will be set forth. Reference may be had to Patent No. 1,976,618 referred to, for a more detailed explanation of the main machine, which is commercially known as the IBM motor driven duplicating punch. To facilitate cross-reference the same reference characters will be employed as in the patent to like elements and the elements of the invention will be distinguished by the suffix $a$.

The machine is arranged for convenient right-hand operation by a handle or finger piece 2', which when shifted toward the left, as viewed in Fig. 1, either manually or by the power mechanism of the patent will cause picker 2 to advance a blank card from the bottom of stack 4 to the puncing position beneath a row of punches 5. Through the usual connections comprising gear 16, shaft 23, and gear 24, rack 25 is driven to the right carrying with it blank card carriage 6 comprising a left and right guide, and pattern card carriage 8 comprising also a left and right guide. Blank card 3 and pattern card 10 are shown in their respective carriages which hold them in columnar alignment and with rack 25 in its right-hand position the left-hand portion of card 3 is beneath punches 5.

Figure 3:
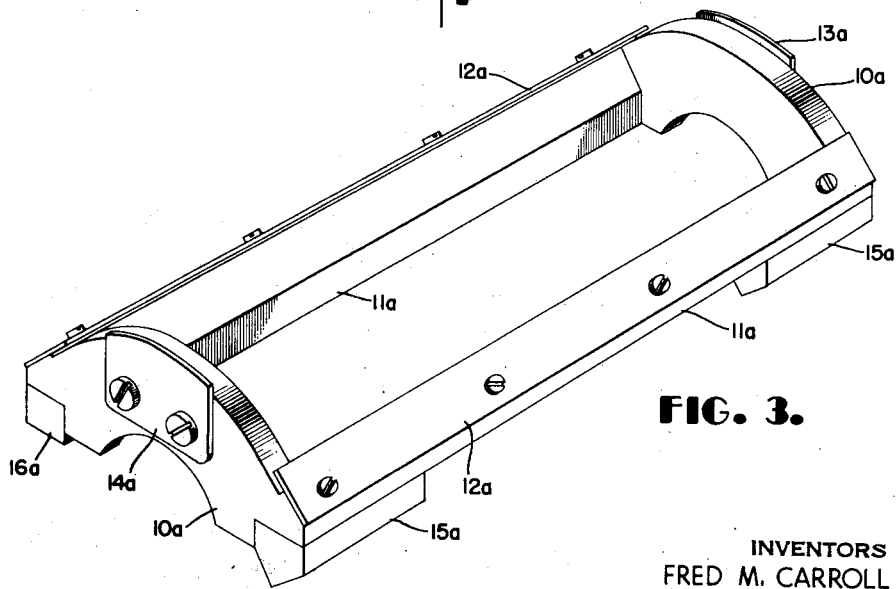
Fig. 3 is a perspective view of the pattern card carriage with the driving connections removed.
Figure 4:
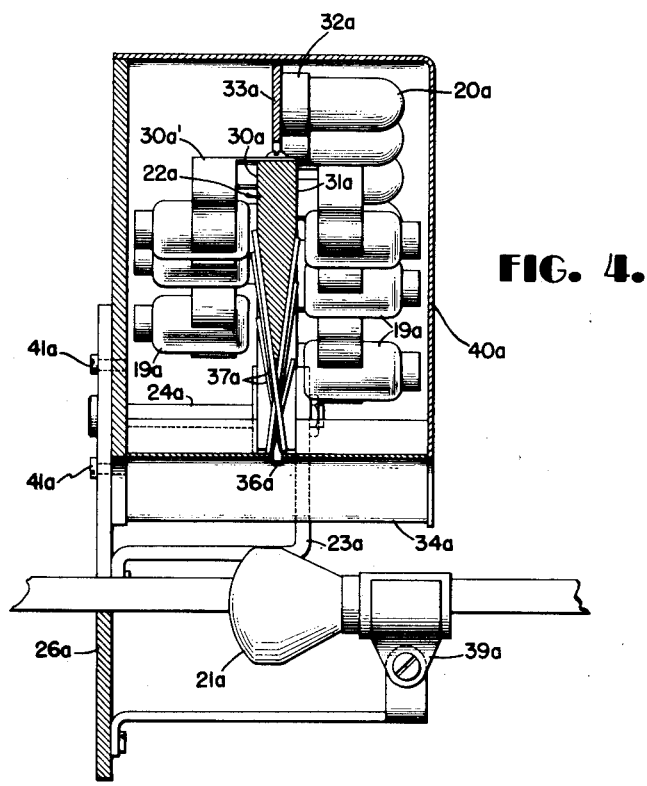
Fig. 4 is a section taken on line 4—4 of Fig. 2 showing the sensing elements.

It should be noted at this point that the structural arrangement of the pattern card carriage 8 of the punching machine has been altered somewhat and for the present case assumes the form shown in Fig. 3. This change is not to be considered a part of the present invention but is merely a means of adapting this carriage for use with the novel sensing mechanisms.

As shown in Fig. 3 the carriage 8 now comprises a main casting composed of a pair of arcuate end members 10a joined by the cross members 11a. The cross members 11a extend a bit higher than the adjoining portion of the top edges of the end members 10a and hence the plates 12a which are fastened to the top of cross members 11a will overlap slightly a portion of the end members 10a. It can be readily seen now that the pattern card 10 may be placed on the carriage by inserting the edges of the card underneath the plates 12a. By virtue of said plates 12a the card is bowed to conform to the arcuate end members 10a. Right and left guide members 13a and 14a are provided to retain the card on the carriage.

Figure 2:
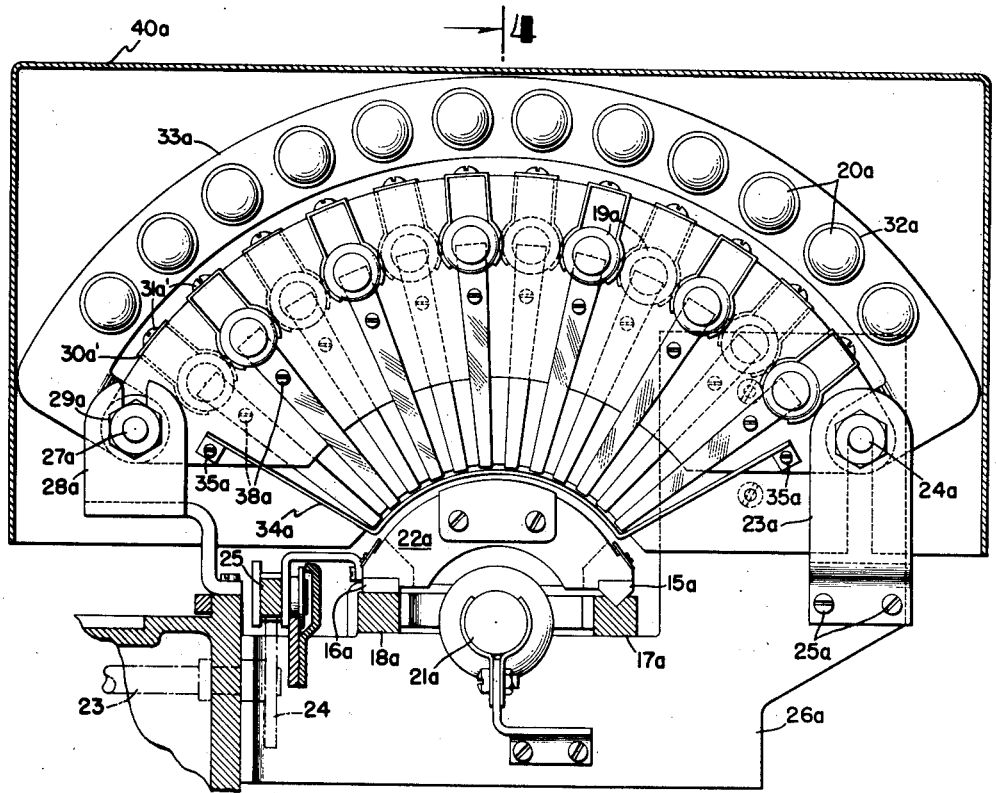
Fig. 2 is a section taken on line 2—2 of Fig. 1 showing the general arrangement on the sensing elements.

Suitable blocks 15a and 16a are attached to the underside of the cross members 11a and serve to provide a sliding connection between the carriage and rails 17a and 18a of the punching machine. As shown in Fig. 2, the carriage is attached to the rack 25 and so is caused to reciprocate by the mechanism of the patent.

Manipulation of keys 9 or energization of magnets 60 will activate the punches and for each actuation, the usual escapement devices are operated to advance the rack 25 and carriages 6 and 8 one card column or step to the left until the cards reach the position of Fig. 1. From this position card 3 is then automatically ejected toward the left and the carriages return to the right where carriage 6 receives a new blank card.

Pattern card 10, however, remains in its carriage so that it returns to the right and then accompanies the next blank card on its journey to the left. This card 10 is provided with perforations in selected columns which it is desired to duplicate in corresponding columns of each card 3. To this end a novel photoelectric sensing mechanism is located in line with punches 5 and the operation is such that when a column of card 10 is in reading position beneath the phototubes 19a, the corresponding column of card 3 is beneath the punches 5. The phototubes, at such times will sense the column of card 10 and if a perforation is found therein, a circuit will be completed through a suitable gas discharge tube 20a to energize the appropriate duplicating magnet 60 to effect punching of a corresponding hole in the column of card 3.

There is a phototube 19a and gas discharge tube 20a provided for each of the usual twelve punch positions of the pattern card. A suitable framework is provided to carry the phototubes and gas discharge tubes in a manner so that they will be arranged compactly and as close to the record card and light source 21a as possible.

The framework comprises an arcuate block 22a having one end pivotally supported in a bracket 23a by means of a pin 24a. The bracket 23a is fastened by a pair of screws 25a to a support plate 26a which is bolted to the frame of the punching machine. The other end of the arcuate block has extending through it a screw bolt 27a which is adapted to be supported in the slotted portion of a bracket 28a bolted to the frame of the machine. The arcuate block may be secured against any movement by tightening a nut 29a on the screw bolt. Loosening of the nut will allow the arcuate block to be pivoted about the pin 24a to make various components of the mechanism more readily accessible.

The phototubes 19a are arranged in the form of an arc near the outer periphery of the arcuate block, as shown in Fig. 2, and are alternately disposed on opposite sides 30a and 31a of said block so that there are six phototubes on each side. Each phototube is mounted in a bracket 30a' which is fastened to the outer periphery of the arcuate block by a screw 31a'.

The twelve gas discharge tubes 20a are mounted in suitable sockets 32a which are arranged in an arc fashion and fastened to one side of an arcuate frame member 33a. Frame member 33a serves to conveniently locate each gas discharge tube directly above its related phototube and it is mounted in the same manner as the arcuate block by having one end pivotally supported by the pin 24a and bracket 23a and its other end supported by the screw bolt 27a and bracket 28a.

As rays of light pass from the light source 21a through the perforations in the record card means are provided to deflect each ray to an associated phototube and further means are provided to insure that the light rays are presented to the phototubes from only one column of perforations at a time.

In this latter connection there is provided a light shield 34a which is in the form of a solid plate with a bowed portion having a curvature resembling that of the bottom of the arcuate block as shown in Fig. 2. The end portions of the light shield extend outwardly and upwardly and are fastened to one side of the arcuate block by screws 35a so that the shield centrally underlies the arcuate block and is positioned directly over the record card when said card is in analyzing position. Disposed in a central line about the bowed portion of the shield is a row of twelve holes 36a which correspond to the twelve punch positions in each column of the pattern record. As the pattern record is fed column-by-column underneath the shield each column will be successively positioned directly under the holes 36a to permit the light rays to be transmitted to the phototubes for that particular column while light rays from perforations in all other columns will be blocked by the solid portion of the shield.

Figure 5:
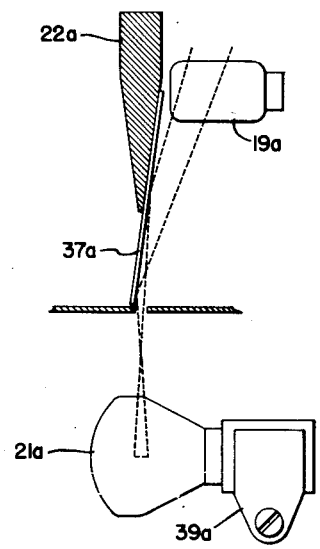
Fig. 5 is a schematic diagram showing the manner in which the light rays are deflected.

To deflect the light rays to their related phototubes there are provided twelve mirror plates 37a arranged in radial fashion and alternately disposed on the opposite sides 30a and 31a of the arcuate block so that there are six mirror plates on each side. The mirror plates are secured to the lower portion of the sides 30a and 31a by means of screws 38a and said lower portions are tapered inwardly toward the bottom of the arcuate block so that each mirror plate extends downwardly at an angle. The mirror plates extend down a sufficient distance so that each one crosses over one of the holes 36a in the light shield. Any light beam passing through the holes 36a strikes one of the mirror plates and is deflected to a related phototube as shown in Fig. 5.

The light source 21a is mounted in a suitable holder 39a attached to the support plate 26a and is located as close to the shield 34a as is possible and still leave sufficient room for card carriage 8 to pass.

To prevent any extraneous light from affecting the phototubes there is provided a cover 40a which is adapted to fit over the frame member 33a and arcuate block. The cover is fastened to the support plate 26a by a pair of screws 41a and has a slotted portion for receiving the pin 24a.

The electrical circuits will now be explained with reference to Fig. 6 wherein the elements are identified by the same reference characters as in the patent to which reference may be had for details of operation.

D. C. power is supplied to the individual phototubes 19a from the A. C. power source by means of rectifier 42a, voltage divider 43a and wire 44a. Each phototube is connected by a wire 45a to the control grid 46a of one of the gas discharge tubes.

A transformer 47a connected across the A. C. power lines 48a and 49a supplies power to the cathode heaters 50a of the tubes. Negative bias is supplied to the control grids 46a from the output of the transformer through rectifier 51a, variable resistor 52a, wire 53a, resistors 54a and wires 45a to maintain the gas tubes in a non-conducting state.

When a perforation is encountered in the pattern record 10, a beam of light is directed to a related phototube and a net voltage is produced at the control grid 46a of the related gas discharge tube 20a which is more positive than the starting voltage. As a result the tube 20a will fire and a circuit is completed from line 49a, wire 55a, contacts 136 normally latched close for punching operations, normally closed cutout contacts 135, floating cam contacts 128 which close coincidentally with the presentations of each card column to the phototubes 19a and punches 5 and remain closed until an escapement is effected to advance the card to the next column, wire 56a, through the plate circuit of the related gas tube 20a, related duplicating magnet 60, wire 57a, contacts 102 closed when carriages 6 and 8 are moving from right to left as during sensing of the pattern card 10, to line 48a.

Operation of magnet 60 will, as usual, punch a hole in card 3 and as an incident thereto cause opening of contacts 128 before the carriages are escaped to the next column. Therefore the plate circuit of the gas discharge tubes will be broken and the tubes restored to a non-conducting state before the next column of the card is in position to be sensed.

Contacts 102 are opened when carriages 6 and 8 are moving from left to right such as when blank cards 3 are being fed into punching position. During this time then, the circuit to the duplicating magnets 60 is broken to avoid operation of punches 5 during the feed in of blank cards 3 by picker knife 2.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Means for analyzing records selectively perforated in columns of index point positions, comprising a light source, a group of phototubes, one for each index point position of the record columns, means supporting said tubes in an arc centered at said light source, means to pass the record column-by-column between said light source and said phototubes, said last means comprising a carriage having an arcuate bed to hold the record in an arc concentrically positioned between said light source and said phototubes, shielding means enclosing said group of phototubes and having a surface along which the record is moved, said surface being apertured along one column of index point positions of the record, to admit light from any perforated index point position coming into register with said apertured portion of said enclosing means to the corresponding phototube.

2. Means for analyzing records selectively perforated in columns of index point positions, comprising a light source, a group of phototubes, one for each index point position of the record columns, means supporting said tubes in an arc centered at said light source, means to pass the record column-by-column between said light source and said phototubes, said last means comprising a carriage having an arcuate bed to hold the record in an arc concentrically positioned between said light source and said phototubes, shielding means enclosing said group of phototubes and having a surface along which the record is moved, said surface being apertured along one column of index point positions of the record, to admit light from any perforated index point position coming into register with said apertured portion of said enclosing means, and deflecting means positioned between said shielding means and the phototubes for directing the light to the corresponding phototube.

3. Means for analyzing records selectively perforated in columns of index point positions, comprising a light source, a group of phototubes, one for each index point position of the record columns, means supporting said tubes in an arc centered at said light source, means to pass the record column-by-column between said light source and said phototubes, said last means comprising a carriage having an arcuate bed to hold the record in an arc concentrically positioned between said light source and said phototubes, shielding means enclosing said group of phototubes and having a surface along which the record is moved, said surface being apertured along one column of index point positions of the record, to admit light from any perforated index point position coming into register with said apertured portion of said enclosing means, and a group of mirror plates, one for each index point position of the record columns for deflecting the light to the corresponding phototube.

4. Means for analyzing records selectively perforated in columns of index point positions, comprising a light source, a group of phototubes, one for each index point position of the record columns, an arcuate block, said tubes being alternately disposed on opposite sides of said block in an arc centered at said light source, means to pass the record column-by-column between said light source and said phototubes, said last means comprising a carriage having an arcuate bed to hold the record in an arc concentrically positioned between said light source and said phototubes, shielding means enclosing said group of phototubes and having a surface along which the record is moved, said surface being apertured along one column of index point positions of the record, to admit light from any perforated index point position coming into register with said apertured portion of said enclosing means, and a group of mirror plates, one for each index point position of the record columns, said plates being alternately disposed on opposite sides of said block to deflect the light to the corresponding phototube.

FRED M. CARROLL.
GREY M. GURLEY.

No references cited.